UNITED STATES PATENT OFFICE

JOHN CHARLES WALKER, OF ELDORADO, KANSAS, ASSIGNOR, BY MESNE ASSIGNMENTS, TO EMPIRE OIL AND REFINING COMPANY, OF DOVER, DELAWARE, A CORPORATION OF DELAWARE

METHOD OF TREATING WET OILS

No Drawing. Application filed November 13, 1926. Serial No. 148,315.

This invention relates to the treatment of oils and more particularly to a method of treating petroleum oil associated with natural waters to prevent the formation of emulsions of the water-in-oil type and to resolve any emulsions of the above character previously formed.

The petroleum oil producing strata in many localities have water or brine in varying amounts associated with the oil. It has long been known that when crude oil and natural water are pumped together from certain wells into tanks in the field and allowed to settle only a portion of the water settles to the bottom of the tank as free water and between this layer of free water and a layer of oil substantially free of water which is formed at the top of the tank, there is found a layer of BS consisting of an emulsion of the water-in-oil type. This layer of BS is not miscible with water but is readily miscible with and dispersed in oil and this shows that the oil is in the continuous and the water in the dispersed phase, or in other words the emulsion is of the water-in-oil type. It is believed that these BS emulsions are formed largely as a result of the agitation of the oil and brine in the bottom of the well, caused by the pumps, particularly defectively operating pumps, used in bringing the oil to the surface. The quantities of the emulsions so formed are great enough to constitute a serious problem to the oil industry. The emulsions are generally quite stable and therefore difficult to handle, and moreover they interfere seriously with the distillation of the crude oil so that they must be substantially removed from the oil before it is distilled. Various methods have been proposed for treating these emulsions for the purpose of breaking them down and separately collecting the water and oil constituents. Likewise it has been proposed to treat the oil in the bottom of the wells in order to prevent the formation of these emulsions.

The primary object of the present invention is to provide a method for preventing the formation of water-in-oil emulsions and for resolving such emulsions into their several constituents in cases where they have already been formed.

Examination of a concentrated BS emulsion will disclose globules of water surrounded by films apparently of oil, which globules vary in size from those easily visible to the naked eye to sizes which are scarcely discernible with a compound microscope. In general the more stable emulsions contain only the smallest water globules. These emulsions are in general quite stable and though there is concentration or "creaming" out of water globules these globules do not coalesce. It is unlikely that this would be true if the globules of water were merely separated by a layer of oil of low interfacial tension, since upon "creaming out" and consequent contact there would be nothing to interrupt coalescense. It is evident therefore that a film of some rigidity protects the water globules. Such a film might be supplied by a colloid such as calcium soap through adsorption at the interface.

The above considerations lead naturally to the assumption that a powerful colloid is present either in the oil or in the water. Since the emulsion is of the water-in-oil type the natural inference would appear to be that the protective colloid appears in the oil. A large number of experiments have been carried out, the results of which indicate very strongly that it is the asphaltic and resinous bodies present in certain types of crude oils which are chiefly responsible for the formation and stability of the stable and permanent BS emulsions of the water-in-oil type. It has been further found that the asphaltic material present in crude oils yielding BS emulsions is very strongly interfacial and that this asphaltic material may be practically quantitatively removed from the oil by adsorption at the oil-water interface. This powerful interfacial adsorption property is an excellent proof of the efficiency of the resinous and asphaltic materials as emulsifying agents. Further experiments have demonstrated that while the protective colloids present in the oil (asphaltic and resinous bodies, colloidal clay, iron sulfid, etc.) are powerful emulsifying and/or stabilizing agents, they cannot produce peptization and consequent emulsion formation unless the water is first dispersed in small globules by mechanical agitation. Therefore careful handling of the oil water mixture at the well will greatly decrease the emulsion formation.

Another object of the present invention is to provide a method by which the formation of water-in-oil emulsions may be inhibited and by which such emulsions if previously formed may be effectively broken, irrespective of the nature of the oils and brine under treatment.

With these and other objects in view, the invention consists of the improved method of treating wet oils hereinafter described and particularly defined in the claims.

According to the present invention a reagent comprising either a water solution or a colloidal solution or suspension of one or more of the class of compounds hereinafter mentioned is either forced into the oil well in such manner that it mingles with the liquids therein, or else is added to the liquids after they have been pumped from the well, preferably in the pipe lines or field tanks located adjacent to the well.

The substances for treating mixtures of oil and water to prevent the formation of emulsions of the water-in-oil type and/or to break such emulsions after they have formed according to the present invention preferably comprise the sulphonic acids of one or more of the series of compounds which are present in crude cymene, commonly known as spruce turpentine, or the alkaline or ammonium salts of such sulfonated compounds. The preferred reagent consists of a mixture of the ammonium salts of the products derived from the sulphonation of crude cymene.

The reagent is prepared as follows:

Crude cymene or spruce turpentine obtained in the sulfite wood pulp process is treated with an excess of concentrated (66° Bé.) sulfuric acid added slowly and with vigorous stirring, care being taken to keep the temperature of the reacting mixture well below 80° F. On completion of the reaction the materials in the treating vessel are allowed to stratify and the sulfonic acid layer containing a sulfonated or sulfated fraction of the crude cymene is drawn off from the bottom of the vessel, leaving a supernatant light oil layer consisting chiefly of unchanged p-cymene which may be recovered and purified by steam distillation, but which preferably is again sulfonated with concentrated or fuming sulfuric acid at a higher temperature with continuous stirring over a longer period. On completion of this second reaction the material is allowed to cool and stratify and the sulfonated p-cymene obtained is mixed with the sulfonic acids first recovered. The mixture of sulfonic acids is washed free of sulfuric acid by means of water, keeping the temperature below 80° F. as before, and an oil layer is allowed to separate, the diluted acid being run off and the oil layer being again washed with a solution of sodium sulfate to remove all free sulfuric acid. The exact composition of the product is not known, but it is believed to be a mixture of the sulfonic acids of p-cymene and a series of terpenes or terpene-like bodies. Probably o- and m-cymene are also present in small amounts.

The mixture of sulfonic acids obtained by the above procedure has been found to be very effective both in preventing the formation of emulsions of the water-in-oil type and in breaking the most stable of such emulsions. Likewise the sulfonic acid of purified p-cymene has been found to be quite effective as an agent in preventing emulsion formation, and the same is found to be true of the sulfonic acids of these members of the terpene group which can be sulphonated by any means. The sulfonic acid of pure p-cymene is not as effective in breaking emulsions as is the mixture of sulfonic acids obtained by treating crude cymene. This can be explained by the fact that surface tension effects appear to be additive, and where two or more reagents both of which have a tendency to break water and oil emulsions are mixed the additive lowering effect which they have on the surface tension of the water will cause a more efficient break in the emulsion than if either is used alone.

While the mixture of sulfonic acids obtained from crude cymene by the above procedure is effective both in preventing emulsion formation and in breaking emulsions of the water-in-oil type, it has been found that the alkaline reacting salts formed by neutralizing the sulfonic acids with an alkali or an alkaline earth hydroxide or with ammonia are even more effective treating agents. The ammonium salt of any of the individual sulfonic acids formed is much more effective than the sulfonic acid itself and is also more effective than the sodium or potassium salts. Ammonia in water solution tends to decrease or lower the surface tension while caustic soda in water solution tends to increase or raise the surface tension. Accordingly the increased effectiveness of the ammonium salt in breaking emulsions can be explained by the additive lowering effect which it has on surface tension. The most effective and accordingly the preferred reagent according to the present invention is the mixture of ammonium salts which is formed when the mixture of sulfonic acids obtained in the sulfonation of crude cymene is neutralized with ammonia.

In the practical application of the present invention it is preferred to inject a water solution or suspension, or a solution or suspension in oil of one of the substances just mentioned into the casing head of the well continuously while the well pump is in operation. However in some cases it will be found more feasible to treat the wet oil after it has been pumped from the well, preferably by injecting a predetermined amount of the treating agent into the pipe lines during the periods in which the well is being pumped, or by adding the treating agent to the wet oil after it has been separated from the unemulsified portion of its water content in settling tanks adjacent the casing head.

When the treatment is carried on above ground the chief function of the treating agent will be to break the emulsions which have already formed. When the treating agent is added to the oil containing emulsion as it is entering the pipe line a thorough mixing takes place prior to the time at which the wetted oil enters the settling and collecting tanks. In some cases it may be found necessary to carry on the treatment in a special tank fitted up with steam heating coils. By increasing the temperature of the oil the viscosity is considerably lowered and this assists materially in actively breaking down the emulsion and in increasing the rapidity with which the water or brine of the emulsion settles to the bottom of the tank.

The quantity of the reagent which must be used in order to prevent the formation of emulsion while the well is being pumped and/or to break down the emulsions after they have already formed depends entirely upon the character of the emulsion and the character of the oil. Thus if the emulsion is recently formed it will break down much more readily than an emulsion which has been standing in the air or in the bottom of a tank for a considerable period. Likewise the composition of the brines which occur in the oil well will govern to a great extent the amount of reagent necessary to prevent the formation of emulsions. Other factors governing the amount of treating agent which may be used are whether or not the oil has a paraffin or asphaltic base and the reactive amount of each of these substances, the proportions of oil to water in the liquid being pumped from the well, and the amount of gas present in the oil. Also the nature and condition of the pump used in lifting the oil and water from the well and the amount of agitation which the oil and water receive due to the pumping action are important factors modifying the tendency to form emulsions and consequently the amount of treating agent required.

Concentrated solutions of any of the substances described will break the most stubborn emulsions when used in amounts of ½ to 1% by volume of the wet oil being treated. In general much smaller quantities of the treating agent are effective in preventing the formation of emulsions. The action of the treating agents above described in preventing the formation of oil-water emulsions and in breaking such emulsions appears to be more of a physical or a physical-chemical nature than a true chemical nature. However it is to be understood that the invention is not based or dependent upon or limited to any theory except as specifically defined in the accompanying claims.

As already pointed out it has been found that the BS emulsions which give the greatest trouble in the oil industry are all of the water-in-oil type. Experiments have shown that the formation and stability of these emulsions is largely the result of the operation of surface tension phenomena. Asphaltic and resinous matter present in the oil materially lowers the surface tension of the oil. This lowering of the surface tension of the oil results in a concentration of the asphaltic matter at the oil-water interface. The concentration of the solute at the interface increases in accordance with the capacity of that solute for lowering surface tension. Since the emulsifying agent, asphalt, is strongly adsorbed at the oil-water interface due to its powerful lowering effect on the surface tension of the oil the interface tends to curve so as to be concave on the water side. This results in a stable water-in-oil emulsion when the water is broken into small drops by mechanical agitation.

P-cymene-sulphonic acid and the sulphonic acids of eucalyptus oil and similar terpene bodies, the alkali and ammonium salts of these substances and particularly the reagent made by adding ammonia to the sulphonation product of crude cymene, all possess very powerful tendencies to form emulsions of the oil-in-water type. All of the various modified cymene and terpene treating agents herein described are markedly superior to other reagents now in use, both for preventing formation of water-in-oil emulsions and for breaking down such emulsions. This is believed to be due to the fact that they are all powerful emulsifying agents (hydrophile colloids) tending to make oil-in-water emulsion. Thus the addition of these agents to water and oil emulsions in such amounts as to exceed the emulsifying tendency of the asphaltic and resinous bodies in the oil to the formation of the water-in-oil type of emulsion will, by adsorption at the dineric interface, tend to curve the interface so as to be convex at the water side to produce the oil-in-water type of emulsion. When these two tendencies are of equal strength or nearly so, the interface will be torn in opposite directions with equal force (upon agitation) with the result that neither type emulsion will form. Because of their powerful tendencies to form emulsions of the oil-in-water type the reagents prepared from crude cymene are particularly advantageous in treating wet oils to prevent emulsion formation and to break down emulsions after their formation. In general, only very small quantities of the reagent need be added and accordingly the cost of the treatment is comparatively low.

In addition to being powerful emulsifying agents tending to make emulsions of the oil-in-water type (hydrophile colloids) the modified crude cymene products herein described possess other characteristics which make them particularly effective in treating wet oil. Surface tension is high in substances such as water whose molecules possess strong polarity. The molecules of cymene and the terpenes also possess a high degree of polarity, particularly when an $HSO_3$ group or other strongly polar negative radical is linked thereto. The addition of a solute whose molecules possess a high degree of polarity to a solvent such as water whose molecules also possess strong polarity has the effect of rapidly lowering the surface tension of the solvent. It is believed that the possession of a rapid initial drop effect on surface tension is an important property of any treating agents employed for the resolution of emulsions containing liquids possessing strong polarity as the disperse phase. It is believed that certain electro-chemical properties of the reagents prepared from crude sulphite turpentine by sulphonation may also influence markedly their remarkable effectiveness in the treatment of oil water emulsions. Experiments apparently have shown that the possession of an organic anion of high molecular weight, especially one provided with a strong negative group e. g., the $HSO_3$ group in the product of primary or low temperature sulphonation of crude cymene, for instance, is a very desirable property in an emulsifying agent. It is also believed that a high degree of unsaturation is desirable. The reagents obtained by the sulphonation of crude cymene possess the above properties to a marked degree.

While in the foregoing discussion the preferred reagent to be employed in accordance with the present invention has been described as the reaction product of concentrated sulfuric acid and crude sulfite turpentine and/or of the neutral salts of such product, it has been found that effective reagents can also be prepared by reacting crude cymene or one of the compounds present in crude cymene, as for instance, p-cymene, with hydrochloric acid or other halogens or halogen acids and also with nitric acid. The chief characteristic common to sulfuric acid, the halogen acids and nitric acid is the possession of a strongly polar negative radical or group and as a result of the above experiments it is believed that the scope of the present invention is not limited to the use of sulfonated cymene and terpenes or to the natural mixtures of these compounds or their alkaline or ammonium salts, but that the invention in its broader aspects includes also the use of reagents prepared by reacting p-cymene and terpenes or mixtures of two or more of such compounds, as for example the series of compounds present in crude cymene, with any compound supplying a strongly polar negative group. Likewise the invention includes the use of salts prepared by neutralizing such compounds with alkaline or ammonium hydroxides. Likewise it has been found that very satisfactory reagents can be prepared by admixing the reaction products of crude cymene and sulphuric acid or other strong mineral acid or the neutral salts of such products with an ammonia-licorice extract or with a fatty acid compound or a fatty acid modified by having a strongly polar negative group linked thereto, as for example sulpho-oleic acid and its neutral salt. Because of the tendency of the sulphonic acids to corrode metals the neutral salts of such compounds make the most practical treating agents. Thus an extremely effective reagent for breaking emulsions has been prepared by sulphonating a mixture in substantially molecular proportions of p-cymene and oleic acid at a temperature of about 212° F. for a period of at least 4-6 hours and admixing the ammonium salts of the reaction products of such sulphonation with the ammonium salts of the mixture of sulphonic acids produced by the primary or low temperature sulphonation of crude cymene previously described.

P-cymene may be defined chemically as para-methyl isopropyl benzene. As a result of numerous experiments it has been determined that the mineral acid substitution products of compounds having an aromatic hydrocarbon nucleus with one or more alkyl, aryl, or aralkyl radicals linked thereto, and particularly the esters or neutral salts of such products are, in general, extremely effective oil dehydrating agents, individually, and particularly when employed in conjunction with other hydrophile colloids. Thus an extremely satisfactory reagent for use in accordance with the process of the present invention can be prepared by adding or substituting an alkyl radical to or in place of one or more of the H groups normally attached to the nucleus of an aromatic hydrocarbon compound, such as benzene, naphthalene or anthracene or their hydroxyl and other derivatives, sulphonating or otherwise treating the compound thus formed so as to link a strongly polar negative group thereto, and neutralizing the sulphonic acid thus produced with ammonia to form the corresponding ammonium salt. Effective oil dehydrating reagents may also be prepared by linking a strongly polar negative group to the alkyl, aryl, or aralkyl addition or substitution products of non-cyclic unsaturated hydrocarbon compounds of high molecular weight and neutralizing the products with an alkaline reagent. In general, reagents prepared in the manner above described and having one or more alkyl, aryl, or aralkyl radicals in addition to one or more strongly polar negative groups linked thereto, are much more effective in breaking refractory BS emulsions than any of the reagents in common use. The presence of the alkyl or aralkyl group appears to impart to a reagent containing an aromatic nucleus some of the properties possessed by a reagent having an aliphatic nucleus, the reagent at the same time retaining other properties and characteristics imparted only by the aromatic nucleus. For example, it is well-known that the alkaline earth salts of a sulpho-fatty acid are extremely insoluble in water, whereas the corresponding alkaline earth salts of naphthalene sulphonic acid are relatively water soluble. The alkali, alkaline earth and ammonium salts of an alkyl napthalene sulphonic acid are characterized by a water solubility intermediate that of like neutral salts of sulpho-fatty acid and of naphthalene sulphonic acid. The fact that the aromatic sulphonic acids or their alkali and ammonium salts are extremely water soluble prevents their concentration at the oil water interface of the emulsion to any marked extent when they are added thereto. On the other hand, the sulpho-fatty acids and their alkali and ammonium salts have been found to concentrate markedly at the oil water interface of any BS emulsion to which they are added, because of their less marked solubility in the disperse phase of the emulsion. It has been found, however, that the water insolubility of the alkaline earth salts of the sulpho-fatty acids often militates against their effectiveness as oil dehydrating agents, because of the tendency of these water insoluble salts to form hydrophobe colloids by solution in the oil, thus increasing the stable character of the emulsion under treatment. Moreover, the sulpho-fatty acids and their salts have often proven to be unsatisfactory treating agents for the reason that they form undesirable gummy messes between the water layer and the oil after the emulsion treated therewith has been broken. It has been found a distinct advantage in the disruption of water-in-oil emulsions to employ reagents such as those herein described, whose alkali and ammonium salts possess marked water solubility and yet are not so extremely water soluble as to preclude their concentration to a considerable extent at the oil water interface. In general, it may be stated that the ability of a reagent to concentrate itself at the interfacial layers of an emulsion is a measure of its probable effectiveness in breaking said emulsion. Experiments have demonstrated that those reagents which have the greatest initial drop lowering effect on the surface tension of that component of an emulsion forming the disperse phase are the most effective reagents for use in disrupting the emulsion. It has been found that the surface tension lowering effect of naphthalene sulphonic acid on a water-in-oil emulsion is greatly increased by introducing an alkyl group into the naphthalene nucleus. Likewise the tendency of the alkylated naphthalene sulphonic acid towards concentration at the oil water interface of a BS emulsion treated therewith is much greater than the like tendency of an unmodified naphthalene sulphonic acid reagent.

In general, therefore, the invention in its broadest form includes the use of any reagent which can be prepared by reacting the aryl, alkyl, or aralkyl additions or substitution products of materials having an unsaturated hydrocarbon nucleus of high molecular weight, or the mixtures of two or more of these compounds, with any one or more of the strongly polar mineral acids or other material furnishing a strongly polar negative radical at suitable conditions as to temperature, concentration and the like, either with or without subsequent neutralization with an alkaline reacting material and admixture with any compound having a lowering effect on the surface tension of water, as exemplified particularly by emulsifying agents of the hydrophile colloid type, i. e., those agents which are effective in promoting the formation of emulsions of the oil-in-water type.

In the claims emulsions are referred to as comprising oil and water. By the term "water" it is intended to include various brines or salt solutions which are associated with the oils in petroleum strata of the earth. Also in referring to the sulphonic acids of p-cymene and terpenes and to their alkaline salts it is not to be understood that these are chemically pure compounds or in fact true chemical salts. The exact nature and chemical constitution of the various reagents which can be prepared from crude sulfite turpentine by sulphonation and other substitution reactions are not yet definitely known. The materials present in the crude turpentine are in all probability mixtures of p-cymene and terpenes or terpene-like bodies.

Although the method of treating oils and the reagents used have been referred to as particularly adapted both for preventing the formation of petroleum oil emulsions and for dehydrating such emulsions, the method and the reagents are not limited to such a use and may be effectively employed in the treatment of mixtures of water and other types of oil and/or in the treatment of other types of emulsion.

The term "cymene" as it is used in the claims is intended as a generic to define the three position isomerides of cymene, namely p-cymene, o-cymene and m-cymene.

The term "modified unsaturated hydrocarbon" has been used in the claims as a generic term to define a product having an unsaturated hydrocarbon nucleus, either aromatic, hydroaromatic or aliphatic in character and either cyclic or non-cyclic in structure, together with one or more alkyl (aliphatic), aryl (aromatic), or aralkyl (aromatic-aliphatic) radicals and one or more strongly polar negative groups linked as side chains by addition or substitution therewith.

The preferred forms of the invention having been thus described what is claimed as new is:

1. The method of treating mixtures of oil and water to prevent the formation of emulsions of the water-in-oil type and to resolve any such emulsions as have already formed which comprises admixing with the wetted oil a material containing a cymene sulpho-compound.

2. The method of treating mixtures of oil and water to prevent the formation of emulsions of the water-in-oil type and to resolve any such emulsions as have already formed which comprises admixing with the wetted oil a neutral salt of cymene sulphonic acid.

3. The method of treating mixtures of oil and water to prevent the formation of emulsions of the water-in-oil type and to resolve any such emulsions as have already formed which comprises admixing with the wetted oil an ammonium salt of cymene sulphonic acid.

4. The method of treating mixtures of oil and water to prevent the formation of emulsions of the water-in-oil type and to resolve any such emulsions as have already formed which comprises admixing with the wetted oil a material containing an essential oil hydrocarbon sulpho-compound.

5. The method of treating mixtures of oil and water to prevent the formation of emulsions of the water-in-oil type and to resolve any such emulsions as have already formed which comprises admixing with the wetted oil a neutral salt of an essential oil hydrocarbon sulphonic acid.

6. The method of treating mixtures of oil and water to prevent the formation of emulsions of the water-in-oil type and to resolve any such emulsions as have already formed which comprises admixing with the wetted oil an ammonium salt of an essential oil hydrocarbon sulphonic acid.

7. The method of treating mixtures of oil and water to prevent the formation of emulsions of the water-in-oil type and to resolve any such emulsions as have already formed which comprises admixing with the wetted oil a reagent containing a mixture of sulpho-compounds obtainable from the product of sulphonation of crude spruce turpentine.

8. The method of treating mixtures of oil and water to prevent the formation of emulsions of the water-in-oil type and to resolve any such emulsions as have already formed which comprises admixing with the wetted oil a reagent comprising the neutral salts of a mixture of sulphonic acids formed by the sulphonation of crude spruce turpentine.

9. The method of treating mixtures of oil and water to prevent the formation of emulsions of the water-in-oil type and to resolve any such emulsions as have already formed which comprises admixing with the wetted oil a reagent containing a mixture of sulpho-compounds obtainable from the product formed when crude spruce turpentine is sulphonated at temperatures under approximately 80° F.

10. The method of treating mixtures of oil and water to prevent the formation of emulsions of the water-in-oil type and to resolve any such emulsions as have already formed which comprises admixing with the wetted oil a reagent comprising a mixture of salts formed by neutralizing sulphonic acids produced by the sulphonation of crude spruce turpentine at temperatures below 80° F. with an alkaline reagent.

11. The method of treating mixtures of oil and water to prevent the formation of emulsions of the water-in-oil type and to resolve any such emulsions as have already formed which comprises admixing with the wetted oil a reagent comprising the ammonium salts of a mixture of sulphonic acids formed on sulphonation of crude spruce turpentine at temperatures below 80° F.

12. The method of treating mixtures of oil and water to prevent the formation of emulsions of the water-in-oil type and to resolve any such emulsions as have already formed which comprises admixing with the wetted oil in a reagent comprising a cymene sulpho-compound and a sulpho-compound obtainable from the product of sulphonation of crude spruce turpentine at temperatures below 80° F.

13. The method of treating mixtures of oil and water to prevent the formation of emulsions of the water-in-oil type and to resolve any such emulsions as have already formed which comprises admixing with the wetted oil a reagent comprising the neutral salt of cymene sulphonic acid and the neutral salts of the mixture of sulphonic acids formed when spruce turpentine is sulphonated at temperatures below 80° F.

14. The method of treating mixtures of oil and water to prevent the formation of emulsions of the water-in-oil type and to resolve any such emulsions as have already formed which comprises admixing with the wetted oil a reagent comprising a cymene sulpho-compound and a sulpho-fatty acid compound admixed in substantially molecular proportions.

15. The method of treating mixtures of oil and water to prevent the formation of emulsions of the water-in-oil type and to resolve any such emulsions as have already formed which comprises admixing with the wetted oil a reagent comprising a solution of the neutral salts of cymene sulphonic acid and a sulpho-fatty acid.

16. The method of treating mixtures of oil and water to prevent the formation of emulsions of the water-in-oil type and to resolve any such emulsions as have already formed which comprises admixing with the wetted oil a reagent comprising a mixture of a sulpho-fatty acid compound and a sulpho-compound obtainable from the product of sulphonation of crude spruce turpentine at temperatures below 80° F.

17. The method of treating mixtures of oil and water to prevent the formation of emulsions of the water-in-oil type and to resolve any such emulsions as have already formed which comprises admixing with the wetted oil a reagent comprising a mixture of the neutral salts of a sulpho-fatty acid and of a sulphonic acid formed by sulphonating crude spruce turpentine at temperatures below 80° F.

18. The method of treating mixtures of oil and water to prevent the formation of emulsions of the water-in-oil type and to resolve any such emulsions as have already formed which comprises admixing with the wetted oil a reagent comprising a mixture of a sulpho-fatty acid compound, a cymene sulpho-compound, and a sulpho-compound obtainable from the product of sulphonation of crude spruce turpentine at temperatures below 80° F.

19. The method of treating mixtures of oil and water to prevent the formation of emulsions of the water-in-oil type and to resolve any such emulsions as have already formed which comprises admixing with the wetted oil a reagent comprising a mixture of the neutral salts of a sulpho-fatty acid, cymene sulphonic acid and a sulphonic acid formed by sulphonating crude spruce turpentine at temperatures below 80° F.

20. The method of treating mixtures of oil and water to prevent the formation of emulsions of the water-in-oil type and to resolve any such emulsions as have already formed which comprises admixing with the wetted oil a reagent comprising a mixture of the ammonium salts of a sulpho-fatty acid, cymene sulphonic acid and a sulphonic acid formed by sulphonating crude spruce turpentine at temperatures below 80° F.

21. The method of treating mixtures of oil and water to prevent the formation of emulsions of the water-in-oil type and to resolve any such emulsions as have already formed which comprises admixing with the wetted oil a reagent containing a strongly polar negative group obtainable from the substitution products formed by reaction of crude spruce turpentine and a material furnishing a strongly polar negative radical.

22. The method of treating mixtures of oil and water to prevent the formation of emulsions of the water-in-oil type and to resolve any such emulsions as have already formed which comprises admixing with the wetted oil a reagent containing a plurality of strongly polar negative compounds obtainable from the mixture of substitution products formed by reacting crude spruce turpentine and a fatty acid with a material furnishing a strongly polar negative radical.

23. The method of treating mixtures of oil and water to prevent the formation of emulsions of the water-in-oil type and to resolve any such emulsions as have already formed which comprises admixing with the wetted oil a reagent comprising the neutral salts of the substitution products formed when crude spruce turpentine is reacted with a material furnishing a strongly polar negative radical.

24. The method of treating mixtures of oil and water to prevent the formation of emulsions of the water-in-oil type and to resolve any such emulsions as have already formed which comprises admixing with the wetted oil a reagent comprising a mixture of the neutral salts of the substitution products formed when crude spruce turpentine and a fatty acid are allowed to react with a material furnishing a strongly polar negative radical.

25. The method of treating mixtures of oil and water to prevent the formation of emulsions of the water-in-oil type and to resolve any such emulsions as have already formed which comprises admixing with the wetted oil a reagent comprising a mixture of the ammonium salts of the substitution products formed when crude spruce turpentine and a fatty acid are allowed to react with a material furnishing a strongly polar negative radical.

26. The method of treating mixtures of oil and water to prevent the formation of emulsions of the water-in-oil type and to resolve any such emulsions as have already formed, which comprises admixing therewith a reagent containing an aromatic hydrocarbon nucleus having an alkyl radical and a strongly polar negative group linked therewith.

27. The method of treating mixtures of oil and water to prevent the formation of emulsions of the water-in-oil type and to resolve any such emulsions as have already formed, which comprises admixing therewith a reagent containing an aromatic hydrocarbon nucleus having an aryl group and a strongly polar negative group linked therewith.

28. The method of treating mixtures of oil and water to prevent the formation of emulsions of the water-in-oil type and to resolve any such emulsions as have already formed, which comprises admixing therewith a reagent containing an unsaturated hydrocarbon nucleus, having an aryl group and a strongly polar negative group linked therewith.

29. The method of treating mixtures of oil and water to prevent the formation of emulsions of the water-in-oil type and to resolve any such emulsions as have already formed, which comprises admixing therewith a reagent comprising an aromatic hydrocarbon nucleus having an aralkyl radical and a strongly polar negative group linked therewith.

30. The method of treating mixtures of oil and water to prevent the formation of emulsions of the water-in-oil type and to resolve any such emulsions as have already formed, which comprises admixing therewith a reagent comprising an unsaturated hydrocarbon nucleus having an aralkyl radical and a strongly polar negative group linked therewith.

31. The method of treating mixtures of oil and water to prevent the formation of emulsions of the water-in-oil type and to resolve any such emulsions as have already formed, which comprises admixing therewith a reagent comprising the neutral salt of a compound having an aromatic hydrocarbon nucleus and as side chains an alkyl radical and a strongly polar negative group.

32. The method of treating mixtures of oil and water to prevent the formation of emulsions of the water-in-oil type and to resolve any such emulsions as have already formed, which comprises admixing therewith a reagent comprising the neutral salt of a compound having an unsaturated hydrocarbon nucleus and as side chains an alkyl radical and a strongly polar negative group.

33. The method of treating mixtures of oil and water to prevent the formation of emulsions of the water-in-oil type and to resolve any such emulsions as have already formed, which comprises admixing therewith a reagent comprising the neutral salt of a compound having an aromatic hydrocarbon nucleus and as side chains an aryl radical and a strongly polar negative group.

34. The method of treating mixtures of oil and water to prevent the formation of emulsions of the water-in-oil type and to resolve any such emulsions as have already formed, which comprises admixing therewith a reagent comprising the ammonium salt of a compound having an unsaturated hydrocarbon nucleus and as side chains an alkyl radical and a strongly polar negative group.

35. The method of treating mixtures of oil and water to prevent the formation of emulsions of the water-in-oil type and to resolve any such emulsions as have already formed, which comprises admixing therewith a reagent comprising the neutral salt of a compound having an aromatic hydrocarbon nucleus and as side chains an aralkyl radical and a strongly polar negative group.

36. The method of treating mixtures of oil and water to prevent the formation of emulsions of the water-in-oil type and to resolve any such emulsions as have already formed, which comprises admixing therewith a reagent comprising the neutral salt of a compound having an unsaturated hydrocarbon nucleus and as side chains an aralkyl radical and a strongly polar negative group.

37. The method of treating mixtures of oil and water to prevent the formation of emulsions of the water-in-oil type and to resolve any such emulsions as have already formed which comprises admixing therewith a reagent containing an aromatic hydrocarbon nucleus having linked therewith an alkyl group and a strongly polar negative group, in admixture with a hydrophile colloid.

38. The method of treating mixtures of oil and water to prevent the formation of emulsions of the water-in-oil type and to resolve any such emulsions as have already formed which comprises admixing therewith a reagent comprising the neutral salt of an alkylated aromatic sulphonic acid.

39. The method of treating mixtures of oil and water to prevent the formation of emulsions of the water-in-oil type and to resolve any such emulsions as have already formed which comprises admixing therewith a reagent comprising a mixture in substantially equal proportions of the neutral salts of a plurality of alkylated aromatic sulphonic acids.

40. The method of treating mixtures of oil and water to prevent the formation of water-in-oil emulsions and to resolve any such emulsions as have already formed which comprises admixing therewith a solution of a compound consisting of an unsaturated hydrocarbon nucleus having coupled thereto a hydrocarbon radical and a strongly polar negative group.

41. The method of treating mixtures of oil and water to prevent the formation of water-in-oil emulsions and to resolve any such emulsions as have already formed which comprises admixing therewith a solution of the neutral salt of a compound consisting of an unsaturated hydrocarbon nucleus having coupled thereto a hydrocarbon radical and a strongly polar negative group.

42. The method of treating mixtures of oil and water to prevent the formation of water-in-oil emulsions and to resolve any such emulsions as have already formed which comprises admixing therewith a solution of the ammonium salt of a compound consisting of an unsaturated hydrocarbon nucleus having coupled thereto a hydrocarbon radical and a strongly polar negative group.

43. The method of treating mixtures of oil and water to resolve emulsions of the water-in-oil type comprising mixing with the oil and emulsion a small amount of a compound consisting of an unsaturated hydrocarbon nucleus having coupled thereto a hydrocarbon radical and a strongly polar negative group, raising the temperature of the mixture, permitting the heated mixture to stratify and separating water therefrom.

44. The method of treating mixtures of oil and water to resolve emulsions of the water-in-oil type comprising mixing with the oil and emulsion a small amount of the neutral salt of a compound consisting of an unsaturated hydrocarbon nucleus having coupled thereto a hydrocarbon radical and a strongly polar negative group, raising the temperature of the mixture, permitting the heated mixture to stratify and separating water therefrom.

45. The method of treating mixtures of oil and water to resolve emulsions of the water-in-oil type comprising mixing with the oil and emulsion a small amount of the ammonium salt of a compound consisting of an unsaturated hydrocarbon nucleus having coupled thereto a hydrocarbon radical and a strongly polar negative group, raising the temperature of the mixture, permitting the heated mixture to stratify and separating water therefrom.

46. The method of treating mixtures of oil and water to prevent the formation of emulsions of the water-in-oil type and to resolve any such emulsions as have already formed which comprises admixing therewith a reagent containing the neutral salt of an alkylated aromatic sulphonic acid and a fatty acid compound.

In testimony whereof I affix my signature.

JOHN CHARLES WALKER.